United States Patent [19]
Warren

[11] Patent Number: 5,497,660
[45] Date of Patent: Mar. 12, 1996

[54] DIGITAL FORCE BALANCED INSTRUMENT

[75] Inventor: Keith O. Warren, Newbury Park, Calif.

[73] Assignee: Litton Systems, Inc., Woodland Hills, Calif.

[21] Appl. No.: 251,591

[22] Filed: May 31, 1994

[51] Int. Cl.$^6$ ................................................. G01P 15/00
[52] U.S. Cl. ..................... 73/514.18; 73/862.61
[58] Field of Search ........................ 73/517 B, 517 AV, 73/517 A, 514.18, 862.61

[56] References Cited

U.S. PATENT DOCUMENTS

| | | | |
|---|---|---|---|
| 5,054,320 | 10/1991 | Yvon ........................................ | 73/517 B |
| 5,142,921 | 9/1992 | Stewart et al. ......................... | 73/866.1 |
| 5,277,053 | 1/1994 | McLane et al. ........................ | 73/517 B |

OTHER PUBLICATIONS

U.S. Ser. No. 08/097,084, filed Jul. 26, 1993 by Warren.

*Primary Examiner*—Hezron E. William
*Assistant Examiner*—Richard A. Moller
*Attorney, Agent, or Firm*—Paul Y. Feng; Poms, Smith, Lande & Rose

[57] ABSTRACT

A digital force balanced instrument such as an accelerometer that incorporates a directly digital electrostatic forcer with servo loop plates charged by a digital feedback loop is disclosed. The accelerometer has a proofmass electrode suspended in a cantilever configuration between electrodes on either side thereof, which proofmass is displaced upon acceleration. Each side electrode includes a plurality of electrostatic plates sized in binarily weighted multiples of area. An induced signal in the proofmass electrode is quantized via A/D converter in the feedback loop, which activates the appropriate number of plates to force the proofmass to an initial position.

29 Claims, 6 Drawing Sheets

DIGITAL FORCE BALANCED INSTRUMENT

BACKGROUND OF THE INVENTION

1. Field of the Invention

The present invention relates to instruments. More precisely, the present invention relates to a digital force balanced instrument that incorporates a directly digital electrostatic forcer with servo loop plates charged by a digital feedback loop. The present invention is related to co-pending U.S. patent application Ser. No. 08/097,084, filed Jul. 26, 1993, entitled Electrostatically Force Balanced Silicon Accelerometer.

2. Prior Art and Related Information

Precise instruments such as accelerometers are used in a variety of applications, such as in measuring the acceleration or deceleration of a ship, missile, or airplane. A conventional accelerometer uses a pendulum type transducer in which acceleration is detected by noting the displacement of the pendulum. A force is applied to the pendulum, generally by an electromagnetic field, in order to force the pendulum back to its initial, pre-displacement position. By detecting the current required to generate the electromagnetic field, one could determine the acceleration. A more recent accelerometer design relies on a movable, silicon electrode that is positioned between two fixed electrodes while cantilevered to a silicon base. The movable electrode is spaced apart from two fixed electrodes. The entire structure is sandwiched within a glass shell and electrically connected to monitoring circuitry.

Within any system using inertial instruments such as accelerometers, there is a computer that operates on the data provided by the inertial sensor or accelerometer. It is highly desirable for the inertial instruments to output digital data directly to the computer, thereby eliminating the need for complicated quantizer circuitry. Indeed, it is much easier to transmit and operate on a digital representation of a signal rather than on the older, analog form.

There have been attempts to build a digital output accelerometer using electrostatic forcing. These generally fall into two classes: charge controlled (see U.S. Pat. No. 5,142,921), and voltage controlled (see U.S. Ser. Nos. 07/514,114, now abandoned, and 07/908,520, now U.S. Pat. No. 5,277,053). The present invention instrument is voltage controlled, meaning that voltages are applied to the electrostatic forcing plates to produce a force. Also related is Ser. No. 08/097,084 entitled Electrostatically Force Balanced Silicon Accelerometer disclosing processes for fabricating electrostatic forcers.

Also, U.S. Pat. No. 5,142,921 to Stewart et al. discloses a force balanced instrument with electrostatic charge control. More precisely, the invention is directed to a force balanced instrument employing a pendulous mass having combined electrostatic pickoff and forcing plates on opposite sides thereof. The operative principle in the instrument dictates that the resulting force is proportional to the square of the applied voltage.

This principle, known as the square law, necessitates use of a microprocessor to take the square root of the voltage in order to obtain the force. This is a relatively complicated and expensive method, and is inherently non-linear. Potential error sources include numeric round-off in the square root routine or look-up tables of any software used. Also, any rounding or time-constant associated with the application of a voltage pulse exhibits different force weight with different pulse heights.

Another method of linear force balance is achieved by controlling the duty cycle so that the difference in duration between each of the parts of a full cycle is a linear measurement of acceleration. One drawback to this approach is that it tends to use maximum allowable voltage at all times, such that there is a tendency to suddenly move the proofmass in opposite directions. This is commonly referred to as "pinging."

For good bias stability, the application of a large force to the proofmass is to be avoided when only a small force is needed to return the proofmass to the null position. With a large force applied to the proofmass, the electrostatic negative spring rate problems increase, and temperature-dependant non-linearities become worse. One approach to overcoming such pinging problems is to use a high speed clock for fine resolution; however, for many applications, that approach causes an unacceptable increase in the power demand.

Previous voltage-biased, linearized force methods exhibit very large negative spring rates as a result of the electrostatic field from the bias voltage which is always present. The method described in U.S. patent application Ser. No. 07/514,114 does not employ a linearizing bias field, but applies a voltage to plates on one side of the accelerometer proofmass or the other depending on which direction the force is applied.

Accordingly, a need presently exists for a digital force balanced instrument that provides an output digital code that is directly linear with input force. This would eliminate the square law problems.

SUMMARY OF THE INVENTION

In view of the foregoing, it is therefore an object of the present invention digital instrument to provide an output digital code that is directly linear with input force. It is another object of the present invention to not require square or square-rooting in order to obtain force balancing data. It is yet another object of the present invention to provide voltage driven plates, with negligible sensitivity to stray capacitance. It is still yet another object of the present invention to not require an op amp or analog stages in the force balancing output. It is another object of the present invention to employ simplified circuitry; i.e., quantization performed by an A/D converter available as one chip. It is also an object that the present invention instrument should have low applied force near zero g, which should result in good bias performance at low g inputs.

To achieve the foregoing objects, the present invention in a preferred embodiment provides a digital force balanced instrument, an accelerometer in this instance, that comprises a semiconductor proofmass electrode generating an analog output signal. The proofmass is surrounded by a semiconductor substrate base. A hinge supporting the proofmass on the surrounding substrate holds the proofmass in a cantilevered position. Gaps are located between the proofmass and surrounding substrate.

A network of electrostatic plates is disposed in a symmetrical array on the surrounding substrate, on opposite sides of the proofmass. Ideally, the plates are arranged about the dynamic centroid of the proofmass electrode to distribute the electrostatic charge at strategic locations.

A pickoff voltage oscillator is connected to the electrostatic plates, which induces a signal in the proofmass. This signal is amplified by an amplifier connected to the proofmass. A demodulator connected to the amplifier demodulates the analog output signal, and feeds the output to an integrator, which smoothes the analog output signal, and outputs a restore signal having an amplitude indicative of the force required to prevent displacement of the proofmass. An analog to digital converter receives the restore signal and provides a digital output signal representative of the amplitude of the restore signal, which is then held in a plurality of latches corresponding to the electrostatic plates. Each latch selectively provides an output control signal in accordance with the digital output signal to FET switches connected to each corresponding electrostatic plate. In turn, the FET switches activate or ground the corresponding electrostatic plates in accordance with the latch output signal. The electrostatic plates, once activated, generate an electrostatic field that restores the proofmass to an initial position.

The digital output signal of the present invention is therefore linear with the input force. Hence, a square law solving microprocessor is not needed, and the associated expense and complications are eliminated.

DETAILED DESCRIPTION OF THE INVENTION

The following specification describes a digital force balanced instrument. In the description, specific materials and configurations are set forth in order to provide a more complete understanding of the present invention. But it is understood by those skilled in the art that the present invention can be practiced without those specific details. In some instances, well-known elements are not described precisely so as not to obscure the invention.

Generally, the present invention is directed to a digital force balanced instrument with a feedback loop. The underlying principle behind the present invention instrument, as is known in the art, is described as follows. The force F acting on a proofmass due to a voltage V on a forcing electrode (proofmass potential=0) is:

$$F = \frac{\epsilon_r \epsilon_o A V^2}{\delta^2}$$

where $\delta$ is the gap between the proofmass and the electrode. Also, A represents the charged area on the electrode; $\epsilon_o$ is the permittivity of free space; and $\epsilon_r$ is the relative permittivity of the gap between the forcing electrode and the proofmass.

Figure 1:
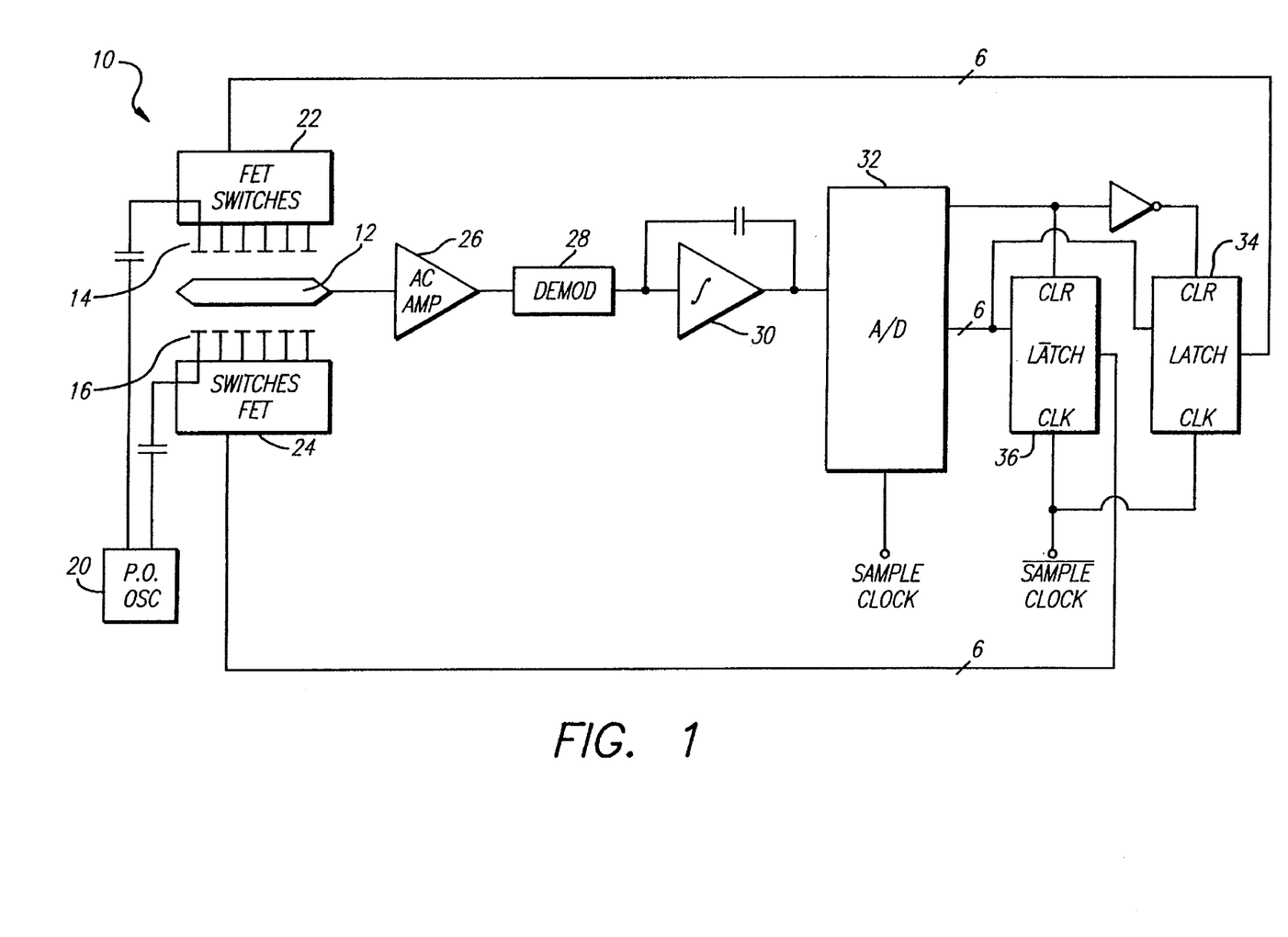
FIG. 1 provides a general schematic overview of a preferred embodiment of the present invention, showing the accelerometer and associated feedback loop circuitry.

FIG. 1 is a schematic overview of a preferred embodiment of the present invention. The preferred embodiment of the present invention instrument is directed to an accelerometer 10 that employs multiple electrodes 14, 16 on either side of the proofmass 12, wherein each electrode 14, 16 is divided into cells of binarily weighted areas. As seen here, once an inertial force is encountered by the accelerometer 10, the proofmass 12 moves and produces a change in the electric field generated by the plates of the electrodes 14, 16.

Figure 2:
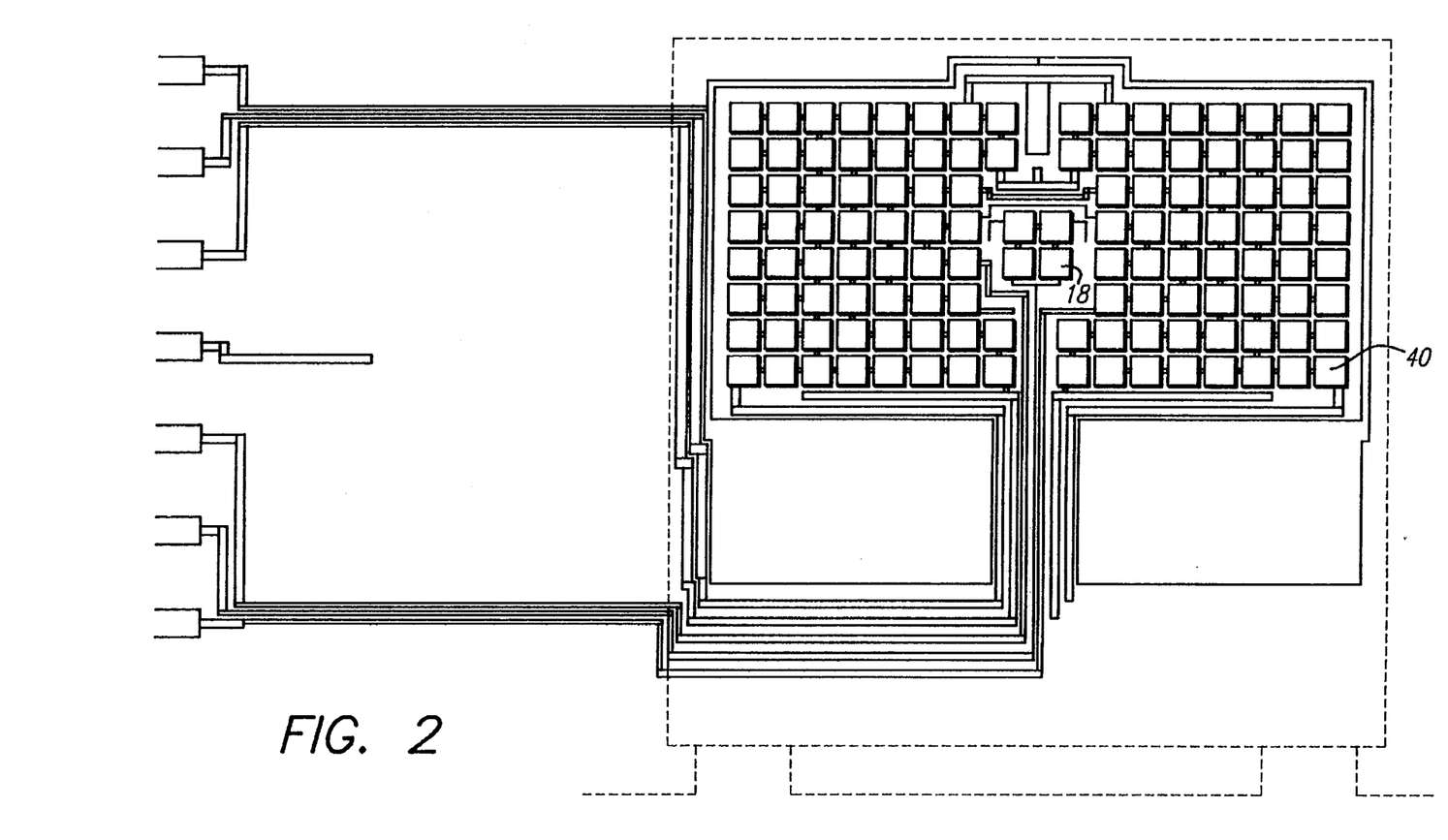
FIGS. 2 and 2A provide a plan view and a magnified plan view, respectively, of a preferred embodiment arrangement of the electrostatic plates disposed on the surrounding substrate.

FIG. 2 is a plan view of a preferred embodiment instrument having plates 40 disposed on the substrate surfaces opposing (e.g., above and below) the proofmass 42. In an alternative embodiment (not shown), the plates may be disposed on the proofmass as well. A constant voltage is switched onto each plate 40 in response to a binary code as required to generate a force that will most closely approximate the input force. Since voltage V is a constant, the accelerometer 10 is operated at one point on the square-law curve with a constant force per unit area. By successively switching unit areas defined by the number of activated plates, when grouped together called cells, off and on in multiples of two at a constant voltage, sufficient numbers of cells are energized and generate an electric field that returns the proofmass 12 to the null position.

It is useful now to define several terms. A "cell," as explained above, is a unit area of an electrode disposed on a substrate or, in the alternative embodiment, the proofmass. When a constant voltage is applied to one of such unit areas, the cell creates a least significant bit of force to the proofmass.

Figure 4:
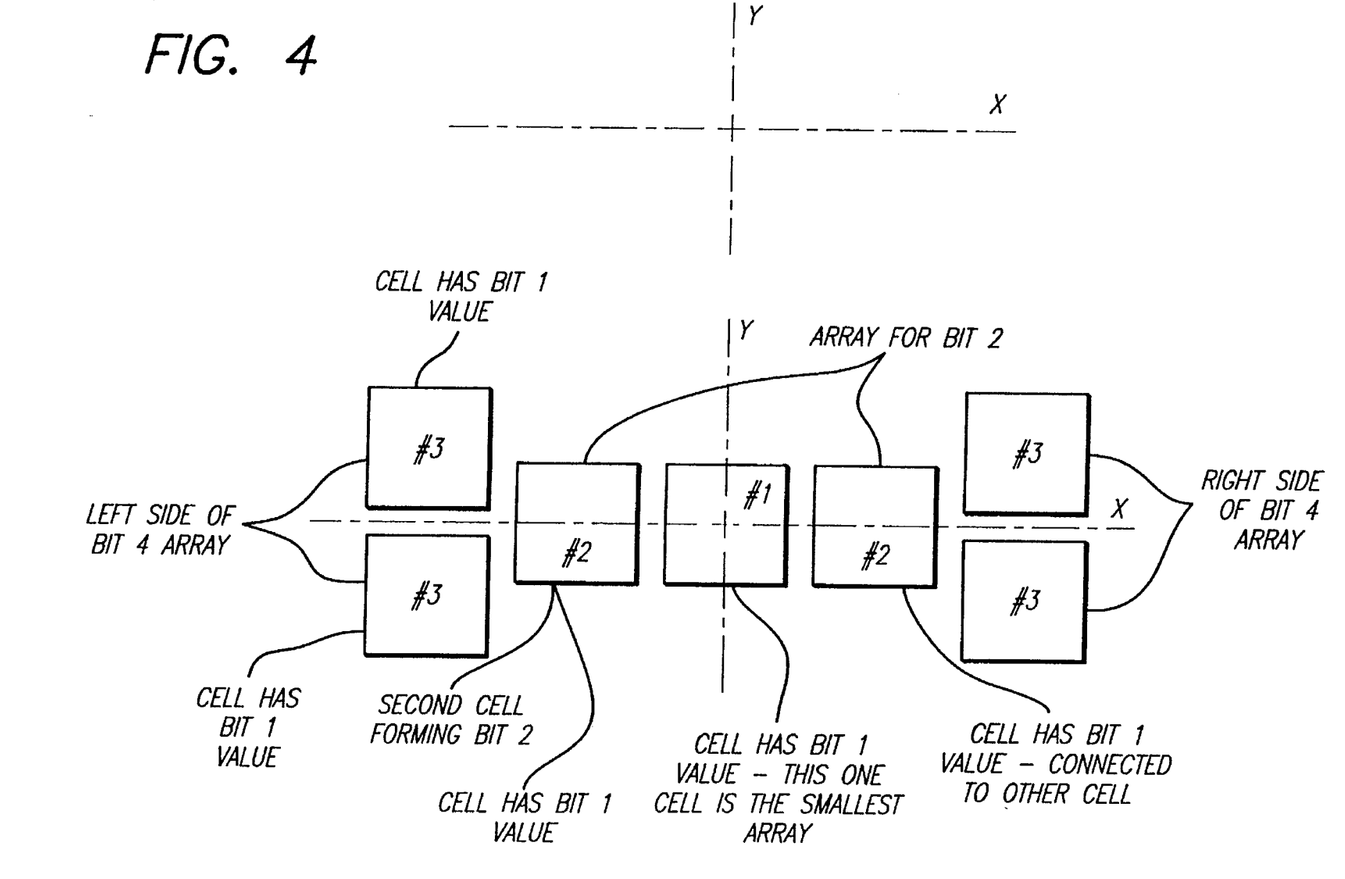
FIG. 4 is a schematic of a pattern defining cells and arrays.

FIG. 4 shows an electrode layout with a smaller arrangement of cells to facilitate explanation. Specifically, FIG. 4 shows one cell or unit area #1, which is a one-bit array. That first square cell #1 has an area of one least significant bit, and is centered on both the x and y axes. This is a one bit cell #1.

Two sets of cells having the same number of cells in each set form an "array" of cells. The combined arrays of cells on the substrate form a "pattern" of cells on the entire substrate.

In FIG. 4, the two adjacent cells #2 form a two-bit array. These two cells #2 are centered on the x axis and are symmetrical to the left and right of the first cell #1. Each of the two cells #2 has a one bit area value, such that when both cells #2 are energized, they represent the two bit value.

Similar results are obtained with a four bit array, which includes four cells #3 each of one bit area value. The four bit array is comprised of two cells #3 to the left of the left second cell #2, and two cells #3 to the right of the right second cell #2. Together these four, one-bit cells #3 represent a four bit value array.

Figure 2A:
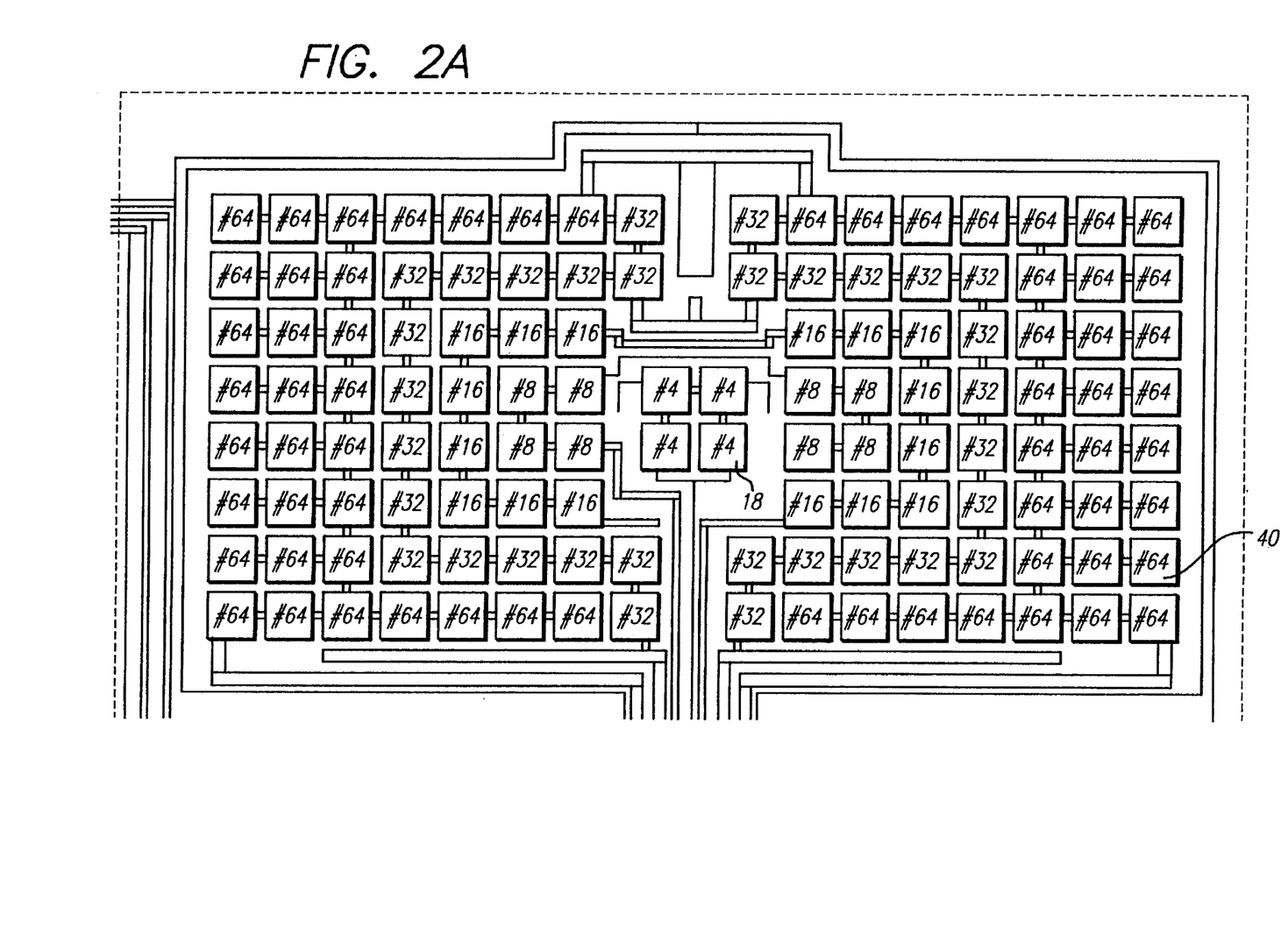

In contrast, as best seen in FIGS. 2 and 2A, the one bit cell has four sections #4, each of which is about one-quarter bit in value. So in the more complex embodiment of FIGS. 2 and 2A, four one-quarter bit sections #4 form the one bit cell. The next sections are for the two-bit value array each includes four, one-quarter-bit sections #8. The next sections are for the four-bit value #16, comprising sixteen one-quarter bit section #16. The next sections are for the eight-bit value #32. The next sections are for the sixteen-bit value #64.

A "set" of cells includes a selected number "S" of cells which are to be energized together during any given time interval. In FIG. 4, the number S of cells to be energized is "one" for one bit since the one cell #1 is of one bit value. As shown in FIG. 4, for a two bit value, only the two #2 cells are energized such that S is two. Similarly, for a four bit value, only the four #3 cells shown in FIG. 4 are energized, and the number S is thus four. Thus, successive sets have binary multiples of value; e.g., 1, 2, 4, 8, 16, 32, 64, etc.

FIGS. 2 and 2A, wherein the latter is a magnified view of the former, show a more complicated array. S is one for the one bit cell, but the one bit cell has four sections #4. For the two bit value, the next two outer cells are energized such that S is two, but each of these cells has four sections #8 so that eight sections are energized.

Figure 5:
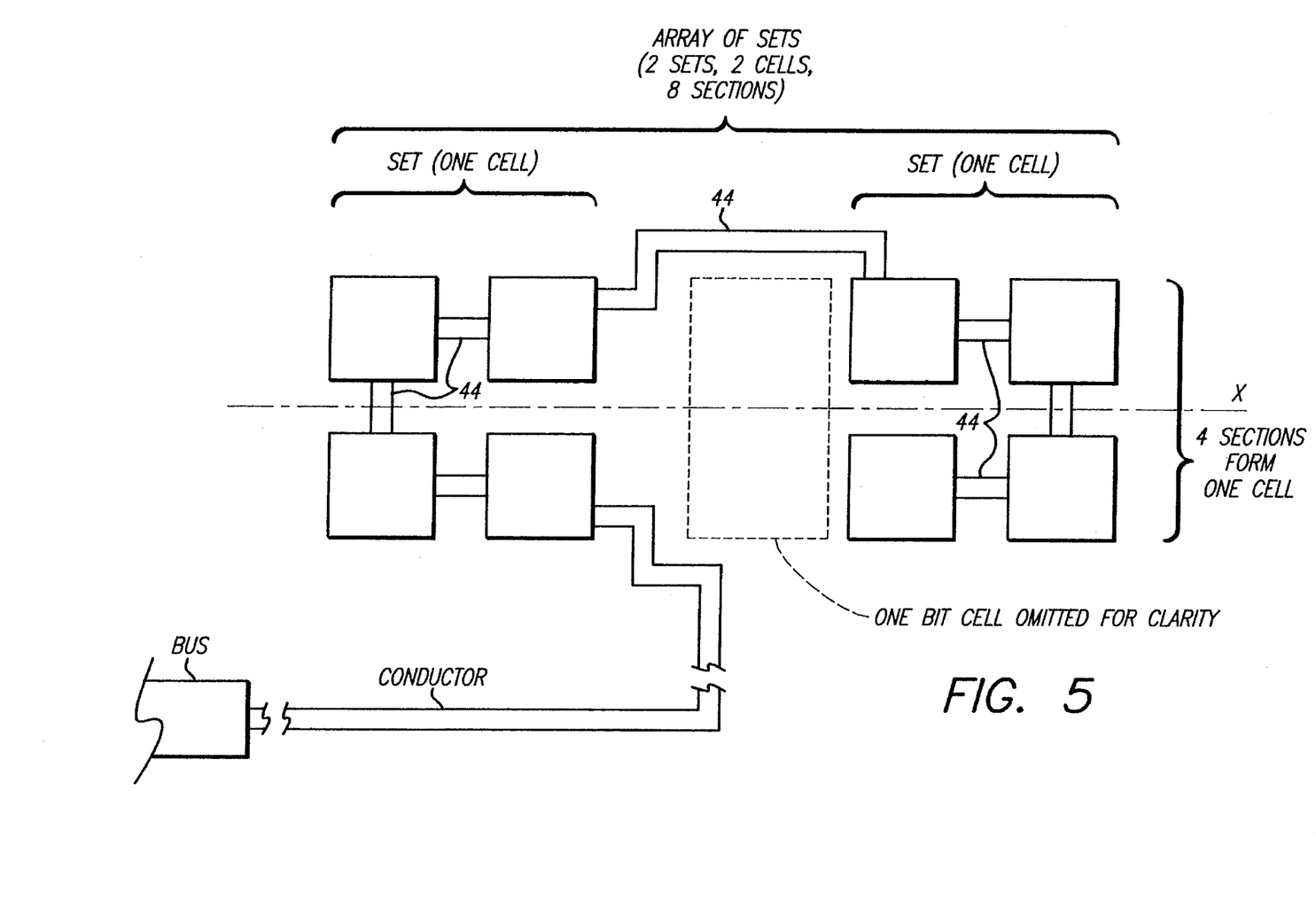
FIG. 5 shows details of the conductors and enlarges a part of FIG. 2.

In each case, the cells of one set are electrically insulated from the cells of another set. One such set is on each side of the centroid of the electrode. This is shown in FIG. 5, which is an enlarge, partial view of FIG. 2. The one-bit cell #1 has been omitted from the drawing for clarity. The interconnection, or intra-cell conductors 44, are shown. As explained earlier, the four-bit array comprised of four one-bit cells #3 are interconnected. A bus 46 and a primary conductor 48 are the main paths for signal input/output for each set of cells. Within a set, there are additional inter-set conductors that extend from the cell on one side of the y-axis to the cell on the other side of the y-axis. Also, the intra-cell conductors 44 electrically interconnecting the sections of one cell. Accordingly, it should be clear the sequence at which the exemplary embodiment energizes cells in order to force the proofmass 12 to its null position after being displaced.

In FIG. 5, it is more important to note that the areas and locations of all of the conductors relative to the hinge must be taken into consideration when calculating the total area of a cell. In particular, voltage appears on all of these conductors, and has an effect on the proofmass. The magnitude of the effect depends on the distance of the conductor from the hinge, and on the area of that conductor.

To enable the areas of the cells to be trimmed—for purposes of assuring cell and conductor symmetry around both the x and y axes, for example—two types of additional conductors are provided. First, "trim" conductor are shown in FIG. 2, and are connected to various cells. The trim conductors are at a particular location. Next, lead ends are shown, but these are not trimmed.

By trimming the trim conductors, and selectively locating the lead ends, and selectively locating the cells, there is no torsional twist around the y axis when voltage is applied to the electrodes, and each of the opposite electrodes applies the same force on the proofmass from oppositely disposed locations.

Finally, in FIG. 2 there is a dashed line shown opposite to the hinge. The dashed line denotes the end of the proofmass such that the inter-set conductor shown in solid line does not have any force effect on the proofmass.

The sets which form a particular array are positioned on the substrate symmetrically relative to an orthogonal axis system (x and y axes), with one set on one side of the y axis, and the other set on the other side of the y axis, and wherein each set is symmetrical relative to the x axis.

There are several factors that influence the particular layout of the cells and sections. The factors include: (1) efficient use of the wafer area; and (2) having the torque applied by the electrode to the proofmass be neutral around each of the x and y axes. This is achieved by disposing all sections symmetrically about the x and y axes. In FIG. 2, for example, the four, eight, and sixteen bit arrays have cells in a "C" or reverse "C" shape for symmetry.

Figure 3:
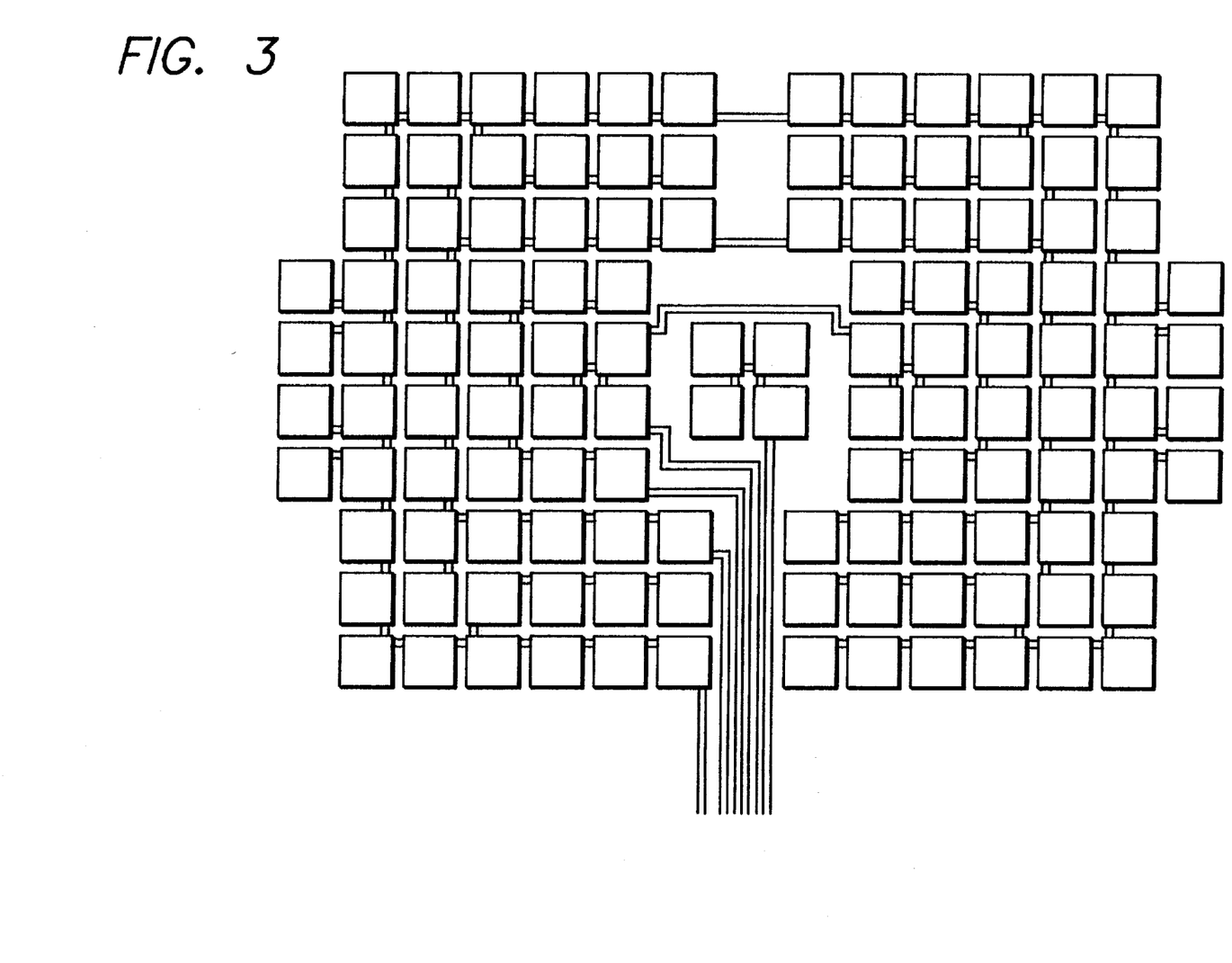
FIG. 3 is a plan view of an alternative embodiment of the present invention with the electrostatic plates.

In the construction of the present invention instrument shown in FIGS. 2, 2A and 3, the electrode 14, 16 layout is composed of the individual cells of area described above. This is done in order to maintain a constant "undercutting periphery" to "enclosed area" ratio, which will be required to accurately photolithographically pattern and etch metallization of the electrodes. The electrode pattern has its area centroid 18 located above the proofmass 12 center of mass or center of percussion (as desired) of the proofmass and is symmetrical about a pendulous axis. The power of binary scaling of the electrode areas is very desirable for direct interfacing to digital computer systems as parallel binary bytes or words. The resolution of this technique for long measurement times is not limited simply to the number of bits of resolution of the electrodes, since changes smaller than the least significant bit can be represented by dithering between the different binary codes in successive time periods. The loop is typically updated at ten kHz.

In a preferred embodiment, as seen in FIGS. 2 and 2A, the proofmass 12 and the opposing, surrounding substrate are made from a semiconductor material. The electrode surfaces are preferably made of Pyrex glass deposited with thin-metal film.

FIG. 1 shows how a digital feedback loop using the electrode plate pattern illustrated in FIGS. 2, 2A and 3 would operate. The accelerometer 10 is shown schematically with six electrodes 14, 16 on each side of the proofmass, representing the binary ratioed electrode areas. For ease of explanation, six plates are shown. These plates 16 are switched to ground or to a constant reference voltage by FET switches 22, 24 in response to a digital code provided by the feedback loop. There can be fewer or more than the six plates shown. The issue as to how many cells to have is one of practicality. Factors include: (a) the cell size, as such; (b) the substrate area size, as such; (c) the desired line width of a conductor (in microns); and (d) keeping an RC time constant of one array the same as an RC time constant of every other array.

A pickoff oscillator 20 supplies a time varying reference signal to the electrode plates 16. The pickoff oscillator 20 is used to provide an initial start position (i.e., pickoff null position) of the proofmass 12. The oscillator 20 is represented as a conventional oscillator, typically operating at about 100 mV at 250 kHz. The oscillator 20 is capacitively coupled into one or all of the plates 16 on each side so as not to interfere with the DC elements generated by the feedback loop, described below.

The electric field generated by the pickoff signal on electrode plates 16 induces an analog signal in the proofmass 12. The signal is amplified by an AC amplifier 26, known in the art.

A phase sensitive demodulator 28 removes a carrier portion of the analog signal originating from the pickoff oscillator 20, and recovers the proofmass 12 position. At this stage, the signal may be optionally rectified. The output signal of the demodulator 28 is then averaged through an integrator 30 with any required loop stability compensation network.

Next, an output signal from the integrator 30 is digitized by an A/D convertor 32 having a built-in sample and hold capability. The A/D convertor 32 operates as a cascading voltage level detector thereby sampling the input analog signal and outputting a 6-bit word indicative of the input signal.

The quantization at the end of each update of the A/D convertor 32 would be output to the system. A stable clock-derived signal controls the sample times of the A/D convertor 32, typically at a rate of tens of kilohertz.

The output signal from the A/D convertor 32 is latched by one of two latches 34, 36 depending on the sign bit, and therefore either the top or bottom set of accelerometer plates 16 respectively, are responding to the digital code. The other latch is cleared and the accelerometer plates 16 are grounded and provide no force. Thus, the digital code having the sign bit resulting from each cycle is output to activate specific FET switches 22, 24, that in turn activate the electrode plates 16. Once a constant voltage is applied to the energized electrode plates 14, 16, the electrostatic field generated thereon restore the proofmass 12 to its initial position.

To measure force, the output signal from the A/D convertor 32 can be sent to an optional microprocessor (not shown) to convert the digital code to a numeric approximation of the detected acceleration. In this manner, the square law is not involved, and neither are the associated inaccuracies and complications associated with a square root subroutine and look-up tables.

What is claimed is:

1. A digital force balanced instrument for detecting an outside force comprising:

a proofmass;

a substrate;

two electrodes disposed on the substrate straddling the proofmass, wherein each electrode is divided into a plurality of cells wherein each cell has a least significant bit of area;

a circuit obtaining a digital signal of a value representing a velocity of the proofmass under the outside force during each of equal units of time, wherein the outside force moves the proofmass from a null position, and wherein the circuit also generates a constant voltage signal;

whereby in accordance with the value of the digital signal, the circuit applies the constant voltage signal to selected cells to energize only such number of cells as is necessary to generate a force from an electric field resulting from the application of the constant voltage signal to the cells in order to urge the proofmass to return to the null position.

2. The digital force balanced instrument of claim 1, wherein the instrument further comprises arrays of cells, wherein each array of cells is selected in binary multiples of the least significant bit areas, and the constant voltage signal is applied to selected arrays of cells in binary multiples of the least significant bit areas.

3. The digital force balanced instrument of claim 2, wherein the electrodes further comprise a semiconductor material.

4. The digital force balanced instrument of claim 3, wherein the arrays of cells are electrically separated.

5. A method of applying force to a proofmass cantilevered on a substrate of a digital force balanced instrument:

providing the proofmass, wherein the proofmass includes a null position and a force-induced position on either side of the null position, wherein the proofmass is responsive to an outside force which moves the proofmass from the null position to one of the force-induced positions;

providing one electrode on each side of the proofmass, each of said electrodes having a plurality of electrically separate cells, wherein each cell has an area value equal to a least significant bit;

during each of equal units of time, obtaining a digital signal having a value representing the change in velocity of the proofmass in response to the outside force;

generating a constant voltage signal;

in accordance with the value of the digital signal, applying the constant voltage signal to selected ones of said electrode cells to energize only such numbers S of said cells as is necessary, using force from an electric field resulting from the application of the constant voltage signal to such cells, to urge the proofmass from the force-induced position to return to the null position.

6. The method of applying force to a proofmass according to claim 5, wherein said constant voltage signal is applied to binary multiples of said cells.

7. The method of applying force to a proofmass according to claim 5, wherein during successive units of time, a particular number of said selected number S of cells is disconnected from the constant voltage signal, and then twice the number S is reconnected to the constant voltage signal, and such disconnecting and reconnecting is continued until the proofmass is returned to the null position.

8. The method of applying force to a proofmass according to claim 7, wherein the particular number S is varied in amount as necessary to cause the proofmass to return to the null position.

9. A digital force balanced instrument for detecting an outside force comprising:

a substrate;

a proofmass electrode for providing an output analog signal;

a hinge connecting the proofmass to said substrate in a cantilever configuration;

a plurality of electrostatic plates selectively operating in unison to form one or more functional cells disposed on either side of the proofmass electrode;

control switches connected to each of said plates;

a pick-off oscillator connected to said plates;

an integrator responsive to the output analog signal to provide an output restore signal indicative of displacement of the proofmass;

a cascading voltage level detector responsive to the output restore signal, to provide an output digital signal containing data proportional to the output restore signal; and a latch corresponding to one plate, receiving the output digital signal from the cascading voltage level detector, wherein the latch activates the respective control switch.

10. The instrument of claim 9, wherein the data further comprises a multiple bit word including a sign bit.

11. The instrument of claim 10, wherein the plurality of plates further comprise first plates disposed on an opposite side of second plates, and the latch further comprises first latches and second latches connected respectively to the first and second plates, wherein the output digital signal from the cascading voltage level detector is directed to the first and second latches depending on the sign bit.

12. The instrument of claim 9, wherein the instrument further comprises an amplifier and a demodulator interconnecting the proofmass to the integrator.

13. The instrument of claim 9, wherein the plates are activated according to a binary pattern.

14. The instrument of claim 9, wherein the cascading voltage level detector further comprises an analog to digital converter.

15. The instrument of claim 9, wherein the control switches further comprise field effect transistors.

16. The instrument of claim 9, wherein the plates are arranged in a predetermined grid pattern.

17. The instrument of claim 9, wherein the proofmass includes a centroid and the plates are disposed about the centroid.

18. A digital force balanced instrument for detecting an outside force comprising:

a proofmass to provide an analog output signal;

a substrate surrounding the proofmass;

a hinge supporting said proofmass on said surrounding substrate; plurality of electrostatic plates selectively operating in unison to form one or more functional cells disposed on the surrounding substrate;

a pickoff voltage oscillator connected to the electrostatic plates;

an integrator receiving the analog output signal and providing a restore signal having an amplitude indicative of a displacement of the proofmass;

an analog to digital converter receiving the restore signal and providing a digital output signal representative of the amplitude of the restore signal;

a plurality of latches corresponding to the electrostatic plates, said latches responding to the digital output signal to selectively provide an output control signal in accordance with the digital output signal; and control switches connected to each corresponding electrostatic plate and each respective latch, wherein the output control signal selectively activates the control switches;

whereby the electrostatic plates are individually activated and generate an electrostatic field that restores the proofmass to an initial position.

19. The instrument of claim 18, wherein the proofmass includes a centroid, and the electrostatic plates are arranged on the surrounding substrate at a predetermined distance from the centroid.

20. The instrument of claim 19, wherein the proofmass includes silicon semiconductor material.

21. The instrument of claim 19, wherein a quantity of activated plates increases proportionally to a value contained in the digital output signal.

22. The instrument of claim 19, wherein each plate includes a silicon semiconductor material.

23. The instrument of claim 19, wherein each plate further comprises a square shape.

24. A digital force balanced instrument for detecting an outside force comprising:

a semiconductor proofmass electrode, providing an analog output signal;

a surrounding semiconductor substrate;

a hinge supporting the proofmass on the surrounding substrate in a cantilevered position;

gaps located between the proofmass and surrounding substrate; plurality of electrostatic plates selectively operating in unison to form one or more functional cells disposed in a grid pattern on the surrounding substrate, on opposite sides of the proofmass;

a pickoff voltage oscillator connected to the electrostatic plates;

an amplifier connected to the proofmass for amplifying the analog output signal;

a demodulator connected to the amplifier for demodulating the analog output signal;

an integrator receiving the analog output signal from the demodulator, and providing a restore signal having an amplitude indicative of a displacement of the proofmass;

an analog to digital converter receiving the restore signal and providing a digital output signal representative of the amplitude of the restore signal;

a plurality of latches corresponding to the electrostatic plates, receiving the digital output signal, wherein each latch selectively provides an output control signal in accordance with the digital output signal;

FET switches connected to each corresponding electrostatic plate and to each corresponding latch, wherein the output control signal selectively activates the FET switches;

whereby the electrostatic plates are individually activated and generate a voltage driven electrostatic field that restores the proofmass to an initial position.

25. The instrument of claim 24, wherein the plates have a constant surface area.

26. The instrument of claim 24, wherein each plate when activated holds a constant DC voltage.

27. The instrument of claim 24, wherein the pickoff voltage oscillator generates an AC voltage.

28. The instrument of claim 24, wherein the plates further comprise a polygonal shape.

29. A digital force balanced instrument for detecting an outside force comprising:

a proofmass, including a centroid, to provide an analog output signal;

a substrate surrounding the proofmass;

a hinge supporting said proofmass on said surrounding substrate; plurality of electrostatic plates disposed on the surrounding substrate at a predetermined distance from the centroid;

a pickoff voltage oscillator connected to the electrostatic plates;

an integrator receiving the analog output signal and providing a restore signal having an amplitude indicative of a displacement of the proofmass;

an analog to digital converter receiving the restore signal and providing a digital output signal representative of the amplitude of the restore signal;

a plurality of latches corresponding to the electrostatic plates, said latches responding to the digital output signal to selectively provide an output control signal in accordance with the digital output signal, wherein a quantity of activated plates increases proportionally to a value contained in the digital output signal; and control switches connected to each corresponding electrostatic plate and each respective latch, wherein the output control signal selectively activates the control switches;

whereby the electrostatic plates are individually activated and generate an electrostatic field that restores the proofmass to an initial position.

* * * * *

UNITED STATES PATENT AND TRADEMARK OFFICE
CERTIFICATE OF CORRECTION

PATENT NO. : 5,497,660
DATED : March 12, 1996
INVENTOR(S) : Keith O. Warren

It is certified that error appears in the above-indentified patent and that said Letters Patent is hereby corrected as shown below:

Column 5, line 27, change "conductor" to --conductors--.

Column 8, Claim 18, line 64, delete "plurality of".

Column 8, Claim 18, line 65, add --a plurality of-- before "electrostatic plates selectively . . ."

Column 9, Claim 24, line 43, delete "plurality of".

Column 9, Claim 24, line 44, add --a plurality of-- before "electrostatic plates selectively . . ."

Column 10, Claim 29, line 32, delete "plurality of".

Column 10, Claim 29, line 33, add --a plurality of-- before "electrostatic plates selectively . . ."

Signed and Sealed this

Eighth Day of October, 1996

Attest:

BRUCE LEHMAN

*Attesting Officer*     *Commissioner of Patents and Trademarks*